UNITED STATES PATENT OFFICE.

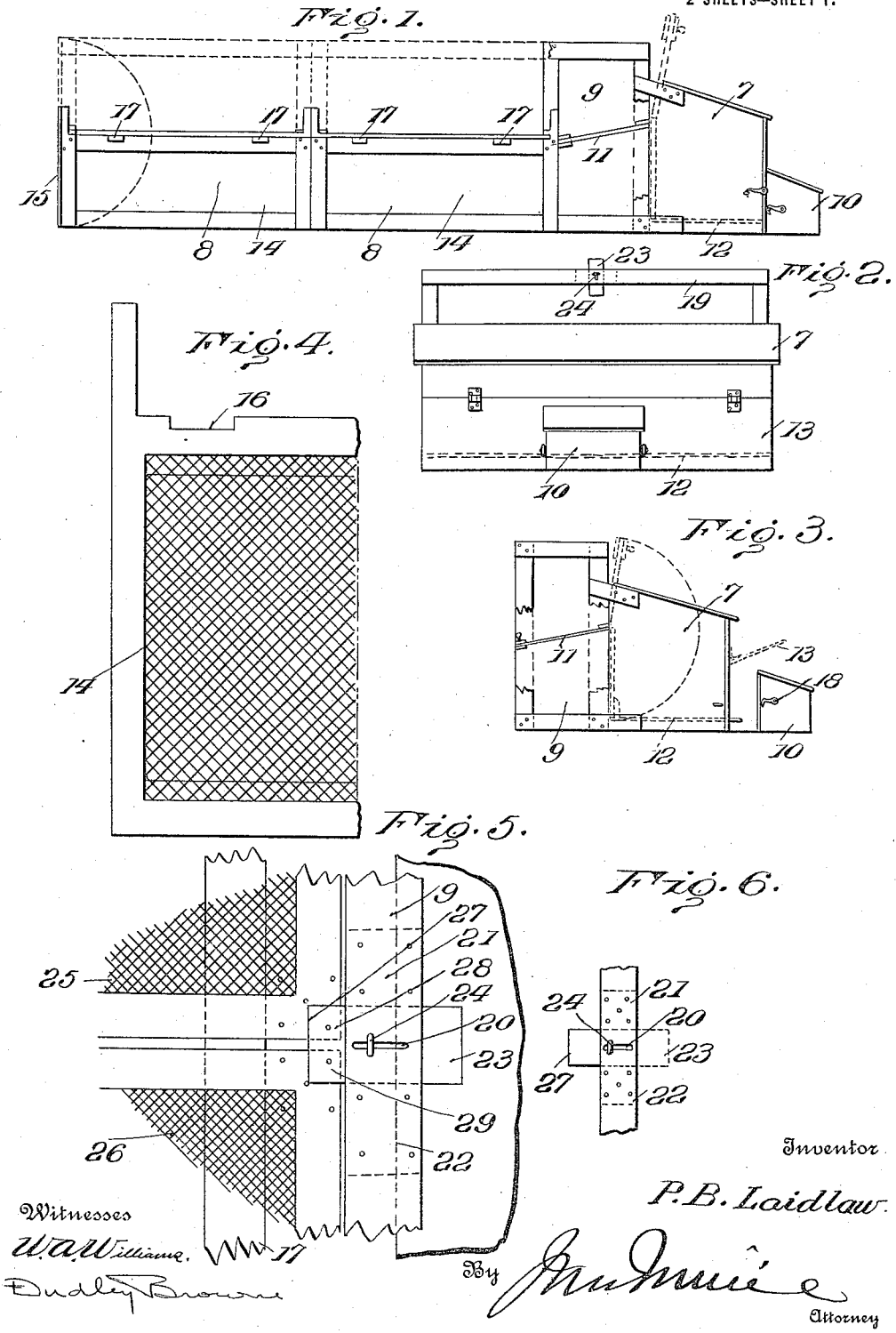

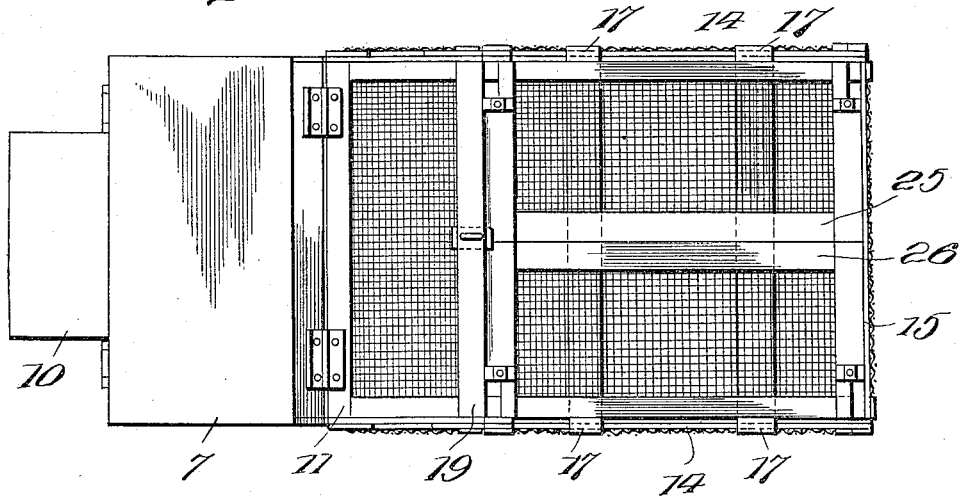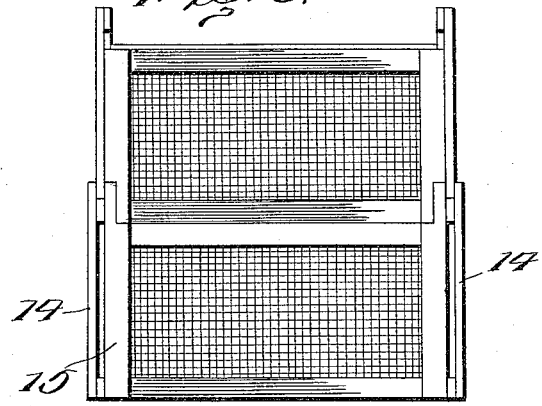

PETER B. LAIDLAW, OF EL PASO, TEXAS.

POULTRY HOUSE AND PEN.

1,150,774.  Specification of Letters Patent.  Patented Aug. 17, 1915.

Application filed January 19, 1914. Serial No. 813,017.

*To all whom it may concern:*

Be it known that I, PETER B. LAIDLAW, citizen of the United States, residing at El Paso, in the county of El Paso and State of Texas, have invented certain new and useful Improvements in Poultry Houses and Pens; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to poultry houses and pens, and more particularly that class of such devices having housing means in connection therewith which may at will be attached or detached to the pen, and is designed as an improvement over my prior Patent No. 1,070,819, August 19, 1913.

The primary object of my invention is to provide a device of the character described possessing advantages over the previous construction and to provide a poultry house and pen more particularly adapted for the raising of young chickens, poultry, game, birds, and pet stocks.

Referring to the drawings forming a portion of this specification, wherein similar reference numerals indicate similar parts wherever used, Figure 1 is a side elevation of a house and pen embodying the preferred form of my invention. Fig. 2 is an end elevation of the same. Fig. 3 is a detail view partly broken away of the house and nest boxes. Fig. 4 is a sectional detail of one of the lower panels. Fig. 5 is a top plan view of the house door in its intermediate position. Fig. 6 is a detail of the means for holding the house door in its intermediate position. Fig. 7 is a top plan view of the device; Fig. 8 is an elevation thereof.

My invention comprises in its main features the house or cover portion 7, the pens 8—8, a space or vestibule 9 between the house and the pens, and nest box 10 attached to the rear of the house portion 7. The house or main portion 7 is provided at its front with a flap door 11, adapted to swing up and back into the various positions shown in Figs. 1, 2, and 3. Within the house 7 is formed a floor 12, which is slidably mounted therein, and adapted to be withdrawn by opening a door 13, at the rear of the house 7, as shown in Fig. 3. Adjoining the vestibule or space 9, are a plurality of pens 8—8, composed of two or more removable pairs of side sections 14—14, and the removable end section 15. The construction of these panels is practically the same as that described in prior Letters Patent No. 1,070,819, and need not be specifically described here. The improvement in these panel sections consists in forming notches 16 in the top stile thereof to provide the necessary support for cross bars 17, which when placed therein lie flush with the top surface of the slide and form a support for the upper and movable pen sections when turned down to form a roofed pen.

As shown in Fig. 3 the nest boxes and the house section are removably attached to each other by means of hooks 18 as in the previous patented construction. The door 11 for the house 7 is composed of rectangular frame work having a bar 19 on the front thereof, which bar is provided with a slot 20 therethrough and having on the inside of said bar adjacent the slide guides 21 and 22 adapted to engage a slidable member 23, having thereon a knob 24 adapted to project upwardly and through the slot 20 and to be slidably held in position thereby.

Referring more particularly to Fig. 5 which shows in partly broken section the top pen sections when turned down, 25 and 26 represent the upper sections of the panels for the pen when turned down in the position to form a roofed pen. 17 designates one of the cross bars shown in Fig. 1, sections 25 and 26 being turned down until they rest thereon.

Should it now be desired to place the door 11 upon a level with the down turned panel sections 25 and 26 in order to form a continuous roof from the end of the pen to the framework of the house, the door 11 is raised to the intermediate position shown in Fig. 1, and the knob 24 operated to slide the member 23 rearwardly until the edge 27 thereof is flush with the outside edge of the front bar 19. The door is then free to swing upwardly until above the level of the down turned pen sections, when the member 23 is slid forwardly by means of the handle 24 until the portion 27 projects in front of the bar 19, when the door is lowered, the member 23 resting upon the meeting edges 28—29 of the down turned upper panels 25 and 26.

Preferably and as shown, the panel sections are rectangular frames covered with a wire mesh, and the house and nest boxes are solid panels, but it is obvious changes might be resorted to without departing from the spirit of the invention as disclosed herein, and it is not my intention to restrict myself to the details set forth, but to construe the claim as broadly as the state of the prior art will permit.

What I claim as new and desire to secure by Letters Patent, is:—

The combination with a breeding house, of a pen adjacent said house, said pen comprising a plurality of members having lower stationary sections provided with notches in the upper edges thereof, upper movable sections hinged to said lower sections, a plurality of cross bars adapted to rest in said notches to support the upper sections in their lowered position, a door on said house, means for supporting said door to form a continuation of the pen roof, said means comprising a member, a projection on said member engaging a slot in said door, whereby the member may engage or disengage the folded sections adjacent thereto to form a continuous roof.

In testimony whereof I have signed my name to this specification in the presence of two subscribing witnesses.

PETER B. LAIDLAW.

Witnesses:
M. A. GOFF,
W. C. McCORMICK.

Copies of this patent may be obtained for five cents each, by addressing the "Commissioner of Patents, Washington, D. C."